United States Patent [19]

Magnusson

[11] Patent Number: 4,467,427

[45] Date of Patent: Aug. 21, 1984

[54] METHOD OF PREVENTING ERRONEOUS GEAR SELECTION IN AN AUTOMATIC GEAR SELECTION SYSTEM IN VEHICLES

[75] Inventor: Karl G. Magnusson, Handen, Sweden

[73] Assignee: Saab-Scania Aktiebolag, Sweden

[21] Appl. No.: 322,852

[22] Filed: Nov. 19, 1981

[30] Foreign Application Priority Data

Nov. 28, 1980 [SE] Sweden .................................. 8008400

[51] Int. Cl.$^3$ ...................... B60K 20/16; G05D 17/02
[52] U.S. Cl. .................................... 364/424.1; 74/866
[58] Field of Search ........................ 74/866; 364/424.1

[56] References Cited

U.S. PATENT DOCUMENTS

| | | | |
|---|---|---|---|
| 4,126,061 | 11/1978 | Fry | 74/866 |
| 4,208,925 | 6/1980 | Miller et al. | 74/866 |
| 4,232,372 | 11/1980 | Berent | 364/566 |

Primary Examiner—Fleix D. Gruber
Assistant Examiner—Oleg Schatoff
Attorney, Agent, or Firm—Ostrolenk, Faber, Gerb & Soffen

[57] ABSTRACT

The invention relates to a method for preventing, in a vehicle transmission coacting with a system for automatic gear selection, the selection of an operationally incorrect gear in the case where a signal representing a vehicle wheel rotational speed, e.g. during braking of the vehicle, does not constitute a correct representation of the vehicle speed. There is thus calculated in the system the wheel rotational speed change, which is compared with a predetermined retardation value. If the retardation limiting value is exceeded, an operative circuit or the like is activated for ensuring that an incorrect gear selection is prevented, e.g. by selecting neutral gear.

For providing, particularly during pulsing braking of long duration a correct determination of when the wheel has returned to a stable state relative the substructure, the invention is distinguished in that the return to normal gear selection occurs only when the wheel speed has reached a given limiting value and the wheel speed change is less than a predetermined limiting value.

3 Claims, 3 Drawing Figures

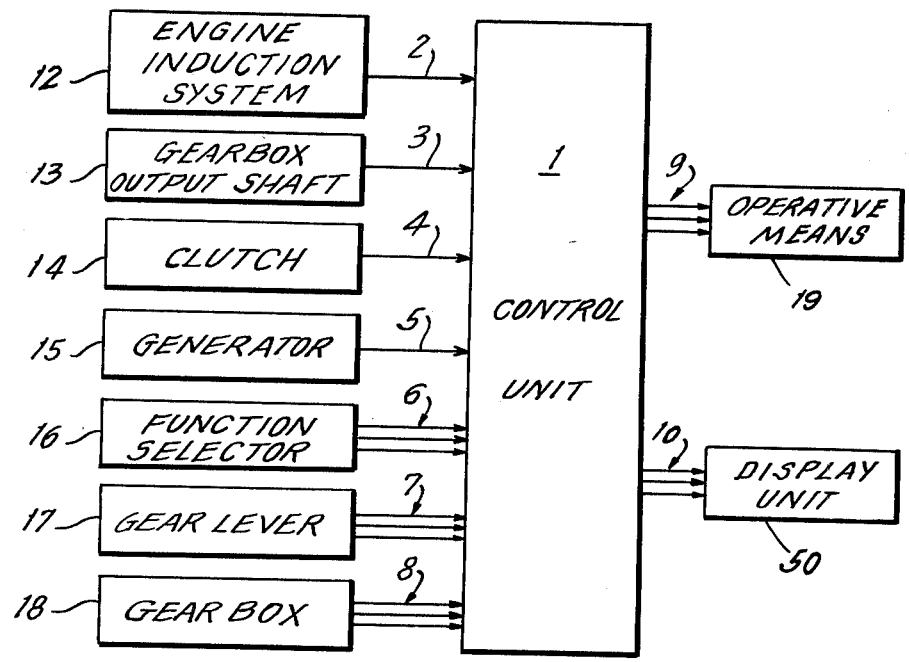
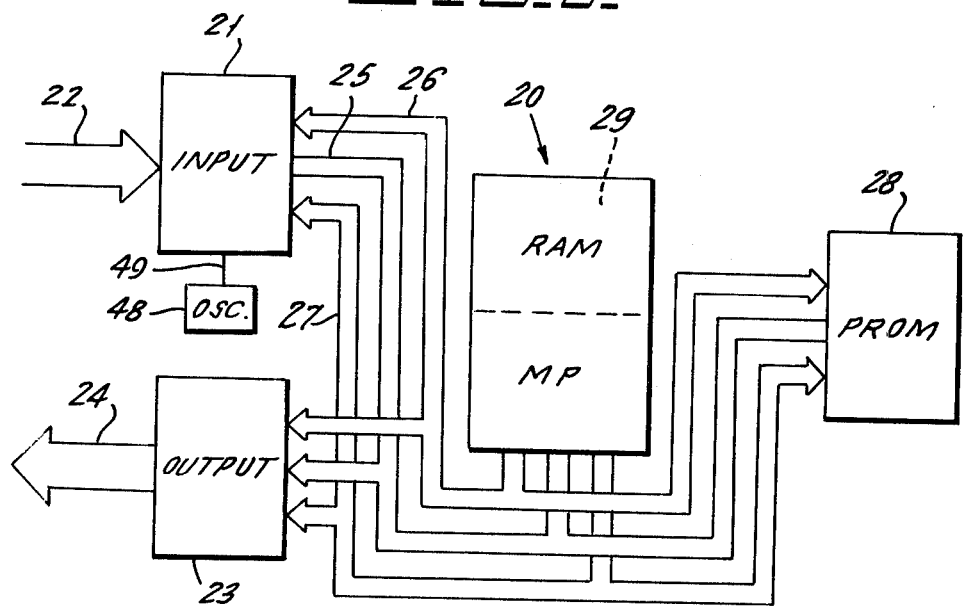

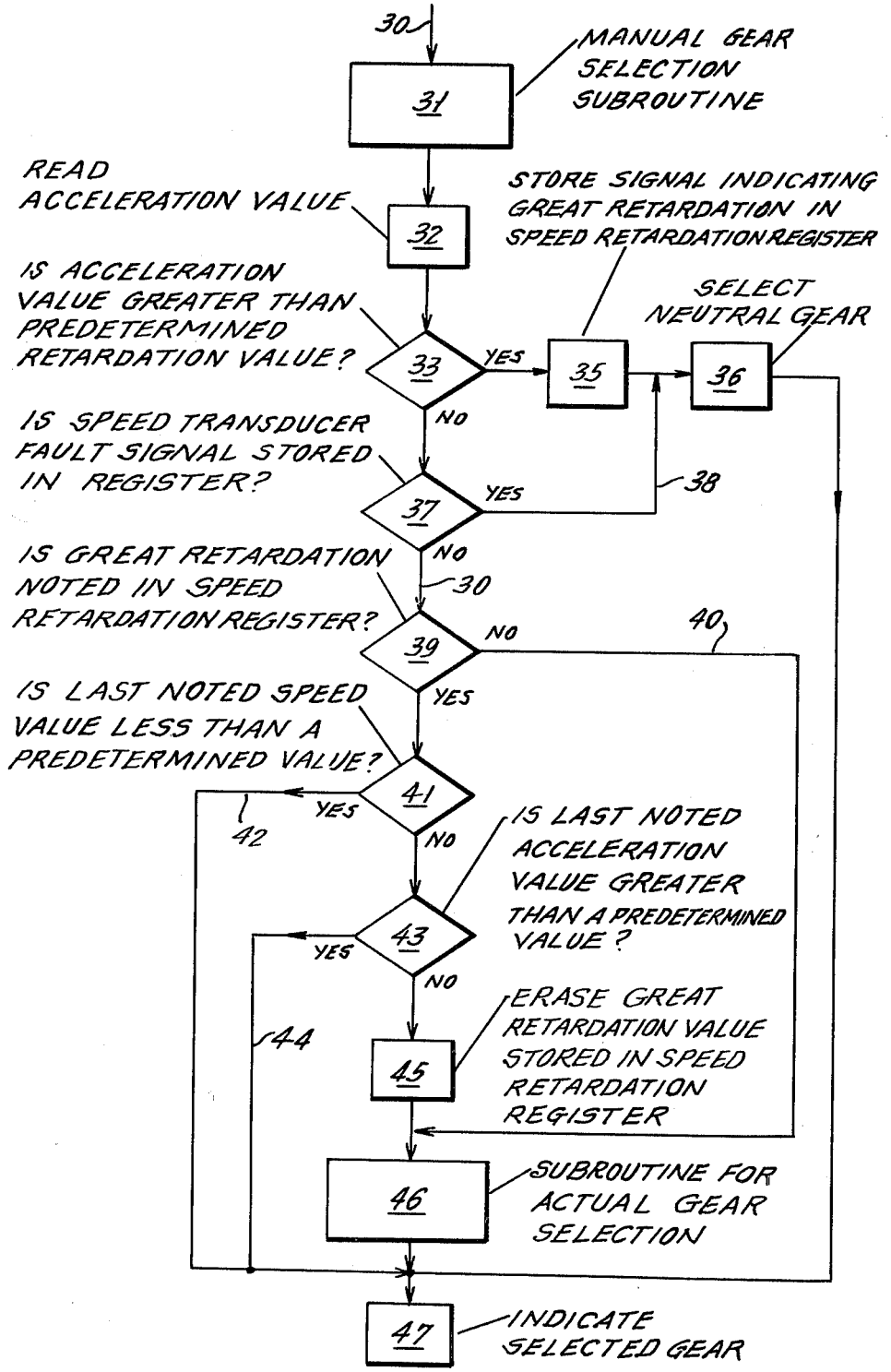

METHOD OF PREVENTING ERRONEOUS GEAR SELECTION IN AN AUTOMATIC GEAR SELECTION SYSTEM IN VEHICLES

BACKGROUND OF THE INVENTION

The present invention relates to vehicles and is directed towards a method for preventing, in a gearbox coacting with a system for automatic gear selection, the selection of an operationally incorrect gear in the cases where the r.p.m. of a vehicle wheel is not a correct representation of the vehicle speed, e.g. during braking of the vehicle, means in the system calculating the instantaneous r.p.m. alteration of the wheel, comparing it with a predetermined retardation value and sending an output signal if the calculated r.p.m. variation exceeds said predetermined retardation value, said output signal activating an operative circuit or the like which thereby caters for the selection of a neutral gear position and/or triggers fault indication in alarm means.

Through the U.S. Pat. No. 4,126,061 it is previously known to make a retardation comparison when a vehicle is braked and to let the output signal from such a comparison control the energization of an operative circuit which causes selection of a neutral gear position for a predetermined period of time, after which the system returns to a normal condition. The means that the known system mentioned returns after a longer braking process, especially a pulsing process, to normal gear selection in spite of braking still being in progress. Unsuitable gear selection will be the result hereof, which can have fatal consequences when the selected gear is engaged, from the aspect of mechanical as well as traffic safety.

BRIEF DESCRIPTION OF THE INVENTION

The present invention has the task of providing, in accordance with the introduction to the description, a method which eliminates the risks of erroneous gear selection. With the said objective, the invention is distinguished in that energizing of the operative circuit is interrupted when the wheel speed represents a certain vehicle speed and the wheel speed variation calculated in the system is less than a predetermined value.

By means of the inventive method, it is ensured that the system returns to normal gear selection function when a wheel, the speed of which is sensed and which is entirely or partially locked during braking, once again returns to a stabilized condition relative the substructure.

BRIEF DESCRIPTION OF THE DRAWINGS

Other features distinguishing the invention will be seen from the description below and the following patent claims. The description is made with reference to the appended drawing, where FIG. 1 schematically illustrates a system for automatic gear selection;

FIG. 2 illustrates in the same way a unit included in the system according to FIG. 1; and FIG. 3 is a flow diagram for gear selection, and illustrates the sensing of a stable wheel condition.

DETAILED DESCRIPTION OF THE PREFERRED EMBODIMENT

The exemplified arrangement is primarily intended for application in an automatic gear selection system for heavy vehicles, the selected gear being engaged in a gear change process initiated manually by the driver. A conventional mechanical transmission with a main clutch between engine and gearbox can thus be retained unchanged, with the result that the comparatively high efficiency of the transmission can also be utilized. In an advantageous implementation of the gear selection system of the present invention, the automatic gear selection may be disengaged to enable a purely manual gear selection. The system also allows casual manual operation even if the automatic gear selection system is engaged. After manual selection of a different gear, the driver has a certain time, 10 seconds for example, to initiate the gear change process. The initiation may, for example, take place by the clutch being depressed, the system then sensing the movement and thereafter automatically taking care of the gear change. When the gear change is completed, this is indicated to the driver by a buzzer and/or an indication lamp, whereupon the driver can again engage the clutch. The system is thereafter prepared for a new gear selection.

The gear selection system in question operates with input signals which relate to a number of parameters which are schematically illustrated in FIG. 1. A lead signal representing the engine load is thus fed to a control unit 1 via a line 2. With an engine equipped with supercharging, said load signal is suitably proportional to the boost pressure in the engine induction system 12. In an alternate application, the position of the vehicle accelerator pedal may constitute a measure of the engine load. Via a line 3 there is fed to the control unit 1 a signal corresponding to the speed of a vehicle wheel, which in most cases is proportional to the speed of the vehicle. In practice, it is suitable to sense the r.p.m. of the gearbox output shaft 13. A signal responsive to the position of a clutch 14 between engine and gearbox and operable by the driver is applied to the control unit 1 via a line 4. A signal is also applied to the control unit 1 via a line 5, the latter signal being responsive to whether or not the engine is running. The latter state is suitably sensed at the generator 15 conventionally connected to the engine. The input signal in a line bunch 6 represents the position of a function selector 16 operable by the driver and which includes the four following alternative positions: a first position relating to driving with manual gear selection, a second position relating to driving with automatic gear selection, a third position relating to selection of neutral gear, and a fourth position relating to selection of reverse gear. A signal from a manually operable gear lever 17 is fed to the control unit 1 via a line bunch 7, and via a line bunch 8 signals representing the state of the gearbox 18, i.e. if a gear is engaged and if so, which one.

In response to the foregoing input signals, the control unit 1 generates output signals which are fed via a line bunch 9 to operative means 19 for executing the gear change, e.g. to a number of solenoid valves controlling compressed air or pressurized hydraulic oil to a number of cylinder units executing the gear change movements. Output signals are also fed via a line bunch 10 to a display unit 50 having a buzzer or similar means for notifying the driver of the gear selection, the gear change completion or whether errors have occured in the control system.

The heart of control unit 1 illustrated in FIG. 2 is a microprocessor 20, which in a manner known per se via a number of input circuits 21 is conventionally fed with input signals via the lines 2, here represented by a line bunch 22. Output circuits 23 adjust the control unit's signals on the line bunches 9, 10, here represented by a line bunch 24, to what is required for actuation of the operative means 19 and the display/buzzer unit 50. In the input and output circuits 21, 23 there are also protective circuits which protect the microprocessor 20 against signals disturbing its function. The output circuits 23 also include an amplifier which amplifies the output signal of the control unit 1 to a level required to actuate the solenoid valves.

Via data lines, address lines and control lines, i.e. data bus 25, address bus 26 and control bus 27, respectively, the microprocessor 20 coacts in a manner known per se in the microcomputer art which the input and output circuits 21, 23 as well as with an external programmable read-only memory denoted PROM 28, and a random access memory denoted RAM 29, built into the microprocessor 20. This is the case, for example, if the microprocessor 20 is of the 6802 type (e.g. made by Motorola), which type has been found advantageous in applying the present invention.

In the control unit 1 there is also included a low-frequency oscillator 48, the pulsed output signals of which are applied via the line 49 to the input circuits 21. Each signal pulse from the oscillator 48, as with each pulse in the signal pulses sent from a speed transducer, causes the microprocessor 20 to execute an interrupt program for speed and acceleration calculation.

According to the interrupt program, which is not described in more detail, the speed is calculated from the number of speed pulses arriving between two pulses from the low-frequency oscillator 48, which corresponds to a time of 0.5 seconds. The speed value thus represents a mean value for said period of time. The acceleration is calculated as the difference between two sequentially calculated speed values.

A program is stored in the PROM 28 for automatic gear selection. The program is illustrated in flow diagram form in FIG. 3 is followed. The gear selection program constitutes a part of a more extensive gear change program, which has gone through a plurality of control routines before reaching a point 30 in FIG. 3. With the availability of manual operation of the automatic gear change system, a routine is required to decide to what extent the operating means for manual gear selection is actuated. The routine is represented by a block 31 illustrated in the figure. If the operating means is activated, the block 31 begins a count-down of a time register, e.g. 10 seconds. During this time, the driver may utilize the manual gear selection. If he does not, the system returns to automatic gear selection process which, according to the flow diagram, begins at a signal processing operation step 32, at which an acceleration value stored in an acceleration register by means of the interrupt program is read. In a subsequent comparing operation step 33, a determination is made as to whether the acceleration value exceeds a predetermined retardation (acceleration) value, e.g. 5 m/s². If it does, e.g. as a result of wheel locking during braking, the program follows a flow path to an operation step 35, at which a signal value representing the fact that the actual retardation value is greater than the predetermined value is noted in a retardation notation register in the RAM 29. After step 35 there is an operation step denoted 36, where selection of neutral gear is made, the gear change program thereafter being terminated by an operation step denoted 47, where the selected gear is indicated on the display unit.

Returning to step 33, if the predetermined retardation value is not exceeded, the program proceeds to a further comparing operation step 37, where it is determined whether a fault memory register in the RAM 29 has a value representing a fault in respect of the speed transducer stored therein, which can take place at a run-through of another part of the gear change program. When a speed error is stored in the fault memory, the program follows flow path 38 to step 36, where a neutral gear is selected. If a speed fault has not been detected, the program proceeds to step 39 where the system checks whether the signal indicating the fact that the actual retardation value is greater than the predetermined value is still noted in the retardation notation register. If not, the program follows flow path 40 to an operation step 46, at which the gear selection is catered for in a manner which is not described in more detail here for utilizing the values of speed, acceleration and load produced in the interrupt program for selecting a suitable gear from tables stored in the PROM 28. If the signal indicating the fact that the actual retardation value is greater than the predetermined value remains in the retardation notation register, the program proceeds to operation step 41, where it is determined whether the last-noted speed value in the interrupt program falls below a certain predetermined speed, which preferably corresponds to a vehicle speed of about 10 km/h. If the speed is less than this value, the program proceeds to the step 47, where the neutral gear already selected in step 36 is registered and indicated. If the predetermined speed is exceeded, the program proceeds to a comparing step 43, where it is determined whether the last-noted acceleration value exceeds a given predetermined limiting value, which to advantage corresponds to a wheel speed change of about 1 m/s². If the limiting value for acceleration is exceeded, the program proceeds to the step 47, wherein information that the neutral gear already selected in step 36 is the recommended gear is stored. If the limiting value sought in step 43 is underpassed, the program proceeds to operation step 45, which ensures that the notation "great retardation" in the retardation notation register is cancelled. In practice, this means that the vehicle wheel has now resumed a stable state relative the substructure, and the system can return to the ordinary gear selection routine carried out in step 46. The gear selected in step 46 is subsequently indicated in the manner mentioned in step 47.

I claim:

1. A method of preventing an automatic selection of an erroneous gear in a vehicle gearbox which is associated with an automatic gear selection system, the method comprising the steps of:
    determining both the instantaneous rotational speed and the instantaneous rotational acceleration value of a vehicle wheel;
    comparing said rotational acceleration value with a first predetermined acceleration value representing a deceleration value;
    following a neutral gear selection routine if and as long as said rotational acceleration value exceeds said first predetermined acceleration value; and
    discontinuing said neutral gear selection routine and following a normal gear selection routine when said rotational speed is equal to or greater than a predetermined speed value and said rotational acceleration value is smaller than a second predetermined rotational acceleration value, which is a deceleration value and which is smaller than said first rotational acceleration value.

2. A method as claimed in claim 1, wherein said predetermined rotational speed corresponds to a vehicle speed of about 10 km/h.

3. A method as claimed in claim 1, wherein said second predetermined rotational acceleration value corresponds to a deceleration of about 1 m/s$^2$.

* * * * *